F. A. SCHROEDER.
ANIMAL POKE.
APPLICATION FILED DEC. 27, 1918.
1,300,657.
Patented Apr. 15, 1919.
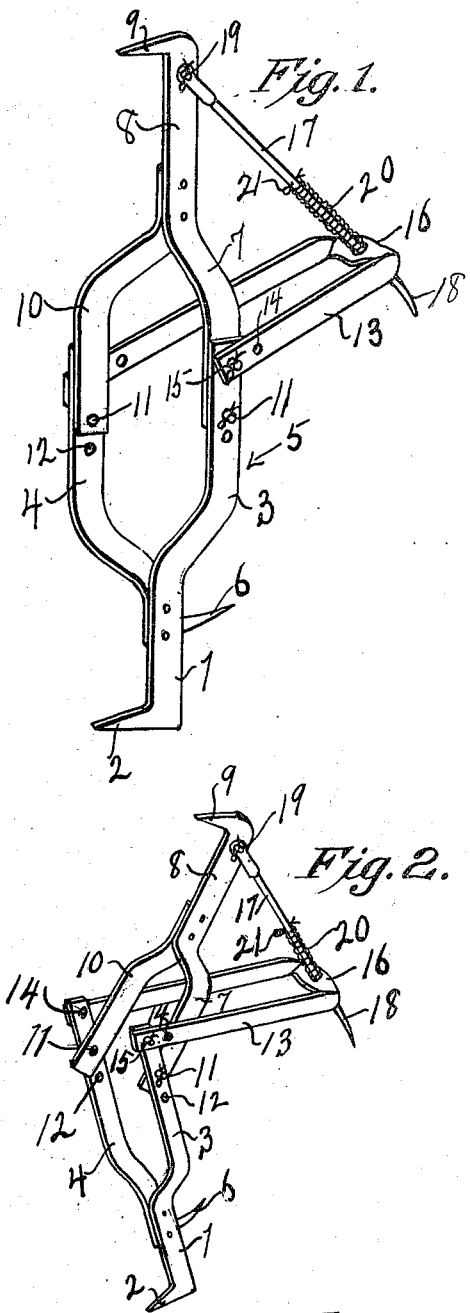
Witnesses
James F. Crown,
S. M. McColl,
Inventor
France A Schroeder,
By Richard Owen,
Attorney

UNITED STATES PATENT OFFICE.

FRANCE A. SCHROEDER, OF SEIBERT, COLORADO.

ANIMAL-POKE.

1,300,657.　　　　Specification of Letters Patent.　　Patented Apr. 15, 1919.

Application filed December 27, 1918. Serial No. 268,561.

*To all whom it may concern:*

Be it known that I, FRANCE A. SCHROEDER, a citizen of the United States, residing at Seibert, in the county of Kit Carson, and State of Colorado, have invented certain new and useful Improvements in Animal-Pokes, of which the following is a specification.

This invention relates to animal pokes, the object thereof being to provide a simple and efficient device of this character for preventing breachy cattle or other stock from going through or over fences.

Another object is to so construct such a device that slight pressure brought to bear either at the top or bottom of the poke will cause prongs to prod the animal sufficiently deep to insure it quickly withdrawing its head and thereby prevent the forcing out of the staples or the loosening of the line wires.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a perspective view of an animal poke constructed in accordance with this invention shown in inoperative normal position, and Fig. 2 is a similar view showing the parts of the poke in the position which they assume when the animal attempts to force its head through the fence.

In the embodiment a stang 1 is shown having its lower end provided with a right-angularly and forwardly disposed arm or finger 2 which is designed when in position upon the neck of an animal to project forwardly so as to engage the fence line or other object when the animal attempts to insert its head through the fence. The bar from which the stang 1 is formed is swelled or bulged outwardly to form the lower portion or one-half of the neck yoke 5, the other half of the lower portion of the neck yoke being formed by a metal bar or plate 4 bulged in the opposite direction to the portion 3. The bar 4 is shown riveted to the stang 1 and has a rearwardly extending prong 6 arranged about midway the length of the stang in suitable position to engage the neck of the animal when the stang is forced inwardly.

The other half or upper portion of the neck yoke is formed by the bar bulged outwardly and pivotally connected at one end with the said bar 3, its upper end being extended to form a standard 8 which is provided at its terminal with a forwardly extending finger 9 designed to be used for the same purpose as the finger 2. An outwardly bowed or bulged bar 10 is riveted at one end to the lower or inner end of the standard 8 and completes the upper portion of yoke 5, said bar being pivotally connected with the free end of bar 4. The bars 3 and 4 are preferably provided with a plurality of longitudinally spaced apertures 12 to provide for the adjustment of the yoke to fit the necks of different sized animals.

A U-shaped member has the free ends of its legs pivotally connected with the upper ends of the bars 3 and 4 and its cross bar 16 is flattened and apertured for the passage therethrough of a rod 17 pivotally connected at one end as shown at 19 to the upper end of standard 8 with its other end sharpened to form a prong 18 which is designed to be positioned above the neck of the animal so that when the member 8 is moved rearwardly this prong will stick into the animal and cause it to withdraw its head. A coiled spring 20 is mounted on the rod 17 between the apertured cross bar 16 of the member 13 and the stop 21 carried by said rod and exerts its tension to normally force the standard 8 into upright normal position with the prong 18 retracted sufficiently to be out of engagement with the neck of the animal when grazing, lying down, or performing its usual functions.

The yoke or U-shaped member 13 is also provided with a plurality of longitudinally spaced apertures 14 to provide for its adjustment to fit the necks of different sized animals and this member lies on and straddles the upper edge of the animal's neck so as to properly position the prong 18 to adapt it to readily engage the animal's neck when the upper portion of the yoke is forced backwardly.

When the animal attempts to insert its head through a wire or other fence, either the finger 2 or 9 or both will come in contact with some portion of the fence and cause the yoke members to bend at their pivotal connection and thus force the prongs 6 and 18 into the animal's neck causing it to quickly withdraw its head to avoid discomfort caused by the prongs.

With a poke constructed in accordance with this invention when pressure is brought to bear on either the top half of the poke or the lower half, the prongs carried thereby are forced into the animal's neck immediately, the forcing inward of the bottom prong of the yoke operates to also actuate the upper half so that the animal is glad to withdraw its head to obtain relief from these stickers.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

Having thus fully described my invention, what I claim as new and desire to secure by Letters Patent, is:—

1. An animal poke comprising a yoke composed of upper and lower sections pivotally connected at their inner ends and carrying forwardly extending fingers at their terminals, a prong carried by the lower section, a U-shaped member pivotally connected at the free ends of its legs with the inner ends of the lower yoke section, and a spring retracted prong carried by the upper section and engaged with said U-shaped member.

2. An animal poke comprising a yoke composed of upper and lower sections pivotally connected at their inner ends and carrying forwardly extending fingers at their terminals, a prong carried by the lower section, a U-shaped member pivotally connected at the free ends of its legs with the inner ends of the lower yoke section, and a spring retracted prong carried by the upper section and engaged with said U-shaped member, said prong extending through said member and having a coiled spring arranged above it to normally retract it.

3. An animal poke comprising a yoke composed of upper and lower sections pivotally connected at their inner ends, the inner ends of the lower section projecting beyond those of the upper section, a rearwardly extending prong carried by the lower section, a U-shaped member pivotally connected at its ends with the free ends of the lower section, the cross bar of said U-shaped member being apertured, a rod pivotally connected with the upper section extending through said cross bar with a prong in its free end, and a coiled spring mounted on said rod for normally retracting said prong.

In testimony whereof I affix my signature in presence of two witnesses.

FRANCE A. SCHROEDER.

Witnesses:
CHARLES R. SMITH,
JOSEPH V. COOK.